Patented Feb. 21, 1933

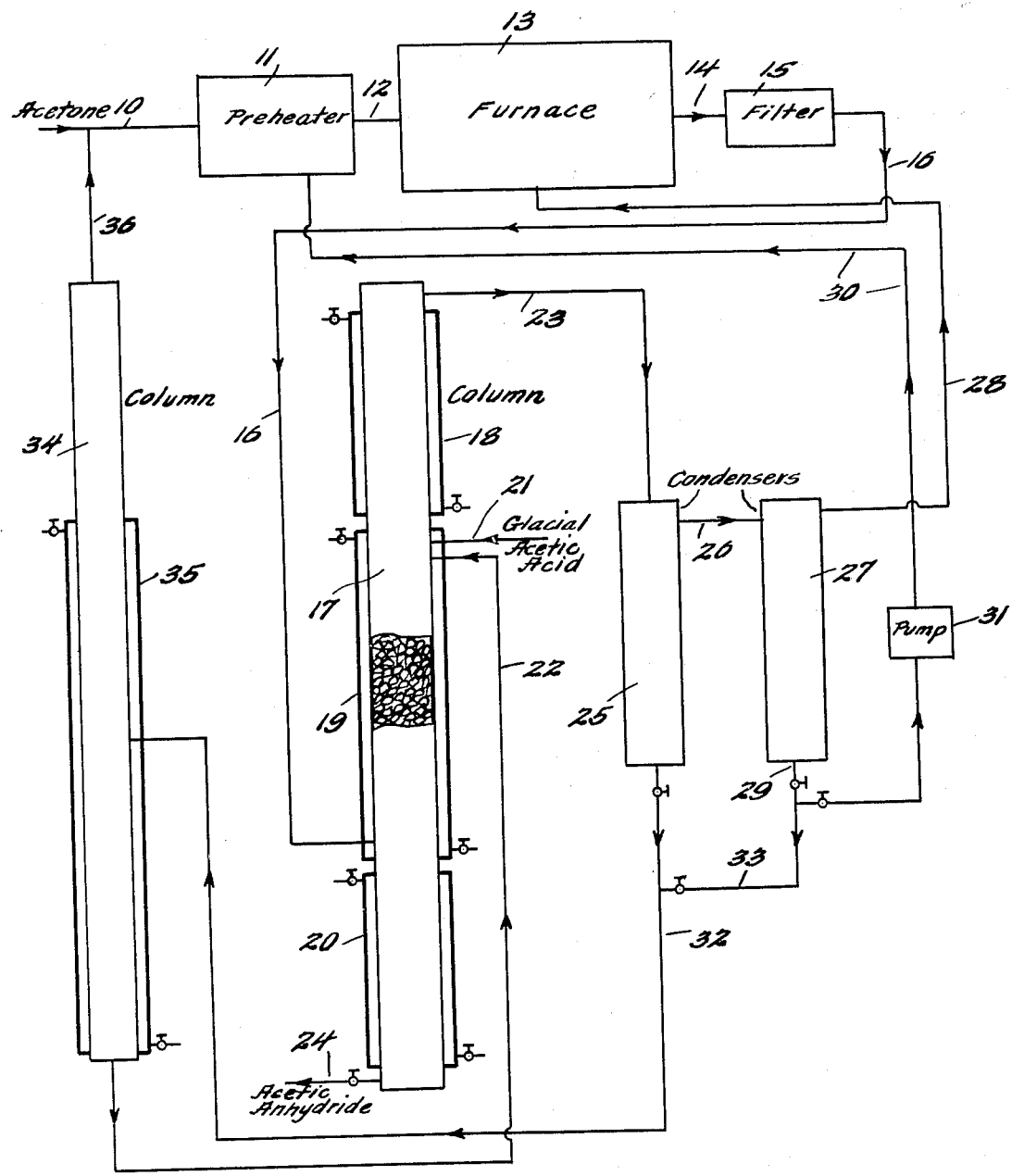

1,898,687

UNITED STATES PATENT OFFICE

FRANCIS O. RICE, OF BALTIMORE, MARYLAND, ASSIGNOR TO ROHM & HAAS COMPANY, OF PHILADELPHIA, PENNSYLVANIA, A CORPORATION OF DELAWARE

ACETYLATION PROCESS

Application filed October 24, 1931. Serial No. 570,905.

This invention relates to acetylation processes, and more particularly to such processes wherein a ketene is employed as the acetylating agent.

It is well known that a ketene reacts with alcohols, amines, acids, and the like to form the corresponding acetylated products. Generally, the processes for making such acetylated products, as heretofore proposed, comprise passing a ketene into a liquid body containing only the substance to be acetylated or the substance to the acetylated dissolved in a suitable organic solvent like ether, allowing the mass to stand, and recovering the acetylated product thus produced. While by such processes it is possible to produce acetylated products, the process according to the present invention produces such products in a purer state and in a much shorter time.

The term "a ketene" as used herein is intended to cover ketene and substituted ketenes.

According to the present invention it has been discovered that if the gas containing a ketene and the substance to be acetylated are caused to contact in such manner that there is a most intimate commingling of the gas and the substance, and effecting such contact at an elevated temperature, that the reaction proceeds quickly and smoothly, with the resulting production of acetylated products in substantially quantitative yields.

The gas containing a ketene employed may be a gas containing ketene represented by the formula $CH_2:C:O$ obtained by any of the known methods. Preferably, the gas containing ketene is that made according to the method disclosed in my co-pending application, Serial No. 431,873, filed February 27, 1930. According to this method acetone vapors diluted with inert gases such as methane, carbon dioxide, and ethylene are passed through a combustion tube provided with a non-catalytic surface heated to an elevated temperature, say 550° to 1200° C., preferably 600° C. If desired, the gas containing a ketene used, may be one containing a substituted ketene, as for example, methyl ketene, dimethyl ketene, diphenyl ketene.

The substance to be acetylated used may be any material which is capable of being acetylated, as for example, an alcohol like ethyl alcohol, propyl alcohol, iso-propyl alcohol, benzyl alcohol, a phenol such as phenol, ortho-, metal-, para-cresol, or a phenol derivative, as for instance, ortho-, metal-, para-nitro- phenol, ortho-, meta-, para- chlorphenol. If desired, the substance to be acetylated may be an amine like aniline, diethylamine, ortho-, meta-, para-, nitro-aniline. Then again, the substance to be acetylated may be an organic acid like acetic acid, butyric acid, benzoic acid, salicylic acid, meta- or para- hydroxy benzoic acids or a derivative of an organic acid such as a derivative of acetic acid like diphenyl acetic acid, chloracetic acid, or the esters of ortho-, meta-, para-hydroxyl benzoic acids. In other words, the substance to be acetylated may be a substance capable of being acetylated included within the group consisting of alcohols, phenols, phenol derivatives, amines, acids, derivatives of acids.

The manner in which the substance to be acetylated and the gas containing a ketene are caused to contact so that there is a most intimate commingling of the individual globules of the substance and the gas may be effected in a number of ways. One method comprises introducing the substance to be acetylated into the top or near the top of a distillation tower and permitting the same to flow downwardly therethrough. Preferably, the tower is provided with either baffles arranged in staggered relation, or perforated trays arranged in superimposed relation and suitably spaced from each other, or it may merely be filled with a suitable chemically inert material like pieces of silica, porcelain, or like refractory material which will act to increase the contact surface between the gas and the substance. The gas containing a ketene in this case is introduced at the bottom or near the bottom of the tower and is caused to flow upwardly therethrough countercurrent to the downflowing substance to be acetylated whereby a most intimate commingling of the globules of the substance and gas containing a ketene is obtained. The gas containing a ketene and the substance react to form an acetylated product in liquid form which flows to the bottom of the tower where the same may be continuously withdrawn.

The temperature at which the intimate contact between the gas containing a ketene and the substance to be acetylated is effected is dependent upon the boiling and decomposition points of the particular substance to be acetylated. For most instances to be acetylated, the preferred temperature is substantially at or slightly above the boiling or melting point but below the decomposition point of the particular substance to be acetylated. Any temperature which lies between 100° to 300° C. has been found to give satisfactory results. Where the reaction between the substance to be acetylated and the gas containing a ketene is carried out in a distillation tower in the manner previously described, the tower in the zone in which the reaction takes place is heated by external means to a temperature such that the interior is at a temperature which corresponds to or is slightly above the boiling or melting point of the substance to be acetylated.

By suitably varying the rate of flow at which the gas containing a ketene and the particular substance to be acetylated are admitted to the tower, it is possible to produce an acetylated product of any desired degree of concentration that may be withdrawn continuously from the bottom of the tower.

The single figure in the accompanying drawing represents a diagrammatic showing of one form of an apparatus which may be used in carrying out the process of the present invention, in association with an apparatus for producing the gas containing ketene for use in the process.

As a specific exemplification of the present invention the process for making acetic anhydride from acetic acid and a gas containing ketene will now be described in conjunction with the apparatus shown in the single figure of the drawing.

Referring to the drawing, pure acetone is introduced through the pipe 10 into the preheater 11 wherein it is heated to a temperature sufficient to vaporize it. The acetone vapors are conducted from the preheater 11 through the pipe 12 into a furnace 13 in which they are heated to a temperature high enough to decompose and convert a portion of the acetone into ketene. The temperature to which the furnace is heated is 550° to 1200° C., preferably 600° C. This results in the formation of a gas mixture containing ketene, undecomposed acetone vapors, methane, carbon dioxide, and ethylene, which mixture for convenience will be hereinafter referred to as a gas containing ketene.

The gas containing ketene is discharged through the pipe 14 into a filter 15 which is filled with a mass of loosely packed asbestos wool. The filter is heated to a temperature of about 200° C. or to any other temperature which is below the decomposition point of the ketene and acetone but above the condensation point of acetone. The gas in passing through the filter is freed of any carbon and dust particles which may have been introduced during the furnace treatment.

From the filter 15 the gas containing ketene is conducted through conduit 16 to the distillation column 17. The column is preferably filled with a suitable baffling material like pieces of silica, porcelain, or like refractory material, which is chemically inert with respect to the reaction ingredients, and which acts to thoroughly disseminate and disperse the substance to be acetylated and cause a most intimate contact and commingling of the dispersed substance and acetylating gas. The interior surface of the column is preferably made of glass, silica, or any other refractory material which is not acted upon by the substance to be acetylated or the acetylated product. The column is provided with a heating jacket for the passage of steam or other heating medium therethrough to heat the column to the desired temperature. Preferably, the column is provided with divided jackets 18, 19, and 20 so that the portions or zones defined by each jacket may be heated and maintained at different temperatures.

The conduit 16 through which the gas containing ketene is introduced into the column connects with the column at a point closely adjacent the bottom of the intermediate portion defined by the jacket 19. At a point close to the top of this intermediate portion of column is provided with a conduit 21 through which a stream of glacial acetic acid from a source of supply and a conduit 22 through which the mixture of glacial acetic acid and acetic anhydride recovered in the process, may be introduced into the column. This portion of the column is heated to a temperature which corresponds to or is slightly above the boiling point of glacial acetic acid. Preferably, it is heated externally to about 130° C.

The upper portion of the column defined by the jacket 18, is heated to and maintained at a temperature which is somewhat lower than the intermediate portion defined by the jacket 19 therebeneath. By so doing, much of the acetone is condensed and refluxes in this portion of the column. All of the refluxed acetone escapes from the top of the column through the outlet pipe 23. The acetone emitted through the outlet pipe is in a fairly pure state being substantially free from acetic acid and acetic anhydride.

The lower portion of the column defined by the jacket 20 is heated to and maintained at a lower temperature than either the intermediate and upper portions of the column, preferably below 100° C.

The liquid glacial acetic acid flows downwardly through the column and is heated to a temperature of about 100° C or slightly higher by means of the heating medium in the jacket 19. In its course through the column it is dispersed and disseminated into globules, and the dispersed globules commingle most intimately with the gas containing ketene which is flowing countercurrent thereto, thus resulting in the formation of acetic anhydride in practically quantitative amounts. The acetic anhydride thus formed flows to the bottom of the column where the same can, if desired, be continuously withdrawn at the outlet 24.

The acetone which has escaped condensation in the upper portion of the column defined by the jacket 18, together with a small quantity of acetic acid, acetic anhydride, and the inert gases such as methane, carbon dioxide, and ethylene are discharged from the top of the column through the outlet pipe 23 into a condenser 25 which is cooled and maintained at a temperature of 0° C. In this condenser a portion of the acetone, and substantially all of the acetic acid and acid anhydride are condensed, and thus separated from the gas.

The gas containing the inert gases methane, carbon dioxide and ethylene and the uncondensed acetone is discharged from the condenser 25 through the pipe 26 into a condenser 27 which is cooled to a temperature of about minus 80° C. In this condenser, the acetone is condensed, and thus separated from the inert gases. The inert gases are withdrawn from the condenser 27 through the conduit 28 and conveyed through said conduit into the furnace 13 where they may be used to dilute the acetone being admitted thereto. If desired, these gases may be employed to heat the furnace.

The acetone which has collected in the condenser 27 is of sufficient purity that it may be introduced into the preheater, and then into the furnace to be converted into a gas containing ketene. This may be done by conducting the acetone from the condenser 27 through the pipes 29 and 30 into the preheater 11 by means of the pump 31.

If desired, the acetone which has collected in the condenser 27 may be withdrawn through the pipe 29, and discharged from said pipe through pipe 33 into conduit 32 containing the mixture of acetone, acetic acid, and acetic anhydride withdrawn from the condenser 25. The mixture contained in the conduit 32 is introduced through said conduit into a distilling column 34 wherein it is distilled, thus resulting in the separation of the acetone from the acetic acid and acetic anhydride. The lower portion of the column is provided with a jacket 35 for the circulation of a heating medium therethrough to heat it to the desired temperature. Preferably, it is heated to a temperature above the boiling point of acetone but below the boiling point of the acetic acid or acetic anhydride, say about 100° C. The conduit 32 connects with the column at a point substantially midway between the ends of the portion defined by the jacket 35.

The distillate, acetone, is discharged from the column 35 through the outlet pipe 36 into the pipe 10, and thence through said pipe into the preheater and furnace wherein it is converted into more gas containing ketene for use in the process.

The residue consisting of glacial acetic acid and acetic anhydride is withdrawn from the column 34 through the conduit 22 and conveyed through said conduit into the top of the intermediate portion of the column 17 wherein the glacial acetic acid is converted into acetic anhydride.

By the process of the present invention, an acid derivative like ortho hydroxy benzoic acid or salicylic acid may be acetylated with a gas containing ketene to thereby obtain acetyl salicylic acid commonly known as aspirin. This may be done in the same apparatus for acetylating glacial acetic acid with a gas containing ketene previously described. In this case the intermediate portion of the column 17 surrounded by the jacket 19 is heated to a higher temperature than for acetylating acetic acid. Preferably, this portion of the column is heated to a temperature which is slightly above the melting point of the salicylic acid, namely about 158° C., and maintained at such temperature throughout the entire reaction. The salicylic acid is introduced into the column through the inlet 21, and is then subjected to the same cycle as above described in connection with the acetylation of acetic acid. In this manner acetyl salicylic acid is produced in quantitative amounts, which is withdrawn from the bottom of the column 17 through the outlet 24.

According to the present invention it is possible to acetylate an alcohol, an amine, a phenol, and a phenol derivative with a gas containing ketene. This may be done in the same apparatus for acetylating an organic acid like glacial acetic acid and an acid derivative like salicylic acid previously described.

To acetylate an alcohol with a gas containing ketene, iso-butyl alcohol is introduced into the column through the inlet 21 and is then subjected to the same cycle as above described in connection with the acetylation of acetic acid. Preferably, the intermediate portion of the column 17 surrounded by the jacket 19 is heated to a temperature which is slightly above the boiling point of the iso-butyl alcohol, namely about 106° C., and maintained at such temperature throughout the entire reaction. Iso-butyl acetate is produced in this manner in quantitative amounts, which is withdrawn from the bottom of the column 17 through the outlet 24.

For the acetylation of an amine with a gas containing a ketene, para-nitro-aniline is introduced into the column through the inlet 21 and is then subjected to the same cycle as above described in connection with the acetylation of acetic acid. In this case the intermediate portion of the column 17 surrounded by the jacket 19 is heated, preferably to a temperature above the melting point of the para-nitro-aniline, namely about 146° C., and maintained at such temperature throughout the entire reaction. Para-nitroacetanilide is formed in quantitative amounts, which is withdrawn from the bottom of the column 17 through the outlet 24.

To acetylate a phenol with a gas containing ketene, hydroxy benzene or phenol is introduced into the column through the inlet 21 and is then subjected to the same cycle as above described for the acetylation of acetic acid. In this case, the intermediate portion of the column 17 surrounded by the jacket 19 is heated, preferably, to a temperature above the melting point of the phenol, namely about 43° C., and maintained at such temperature throughout the entire reaction. Phenyl acetate is formed in quantitative amounts which is withdrawn from the bottom of the column through the outlet 24.

To acetylate a phenol derivative with a gas containing ketene, para-nitro-phenol is introduced into the column through the inlet 21 and is then subjected to the same cycle as above described for the acetylation of acetic acid. In this case, the intermediate portion of the column 17 surrounded by the jacket 19 is heated to a temperature above the melting point of the nitro-phenol, namely about 114° C., but below the decomposition point, as for example 279° C. Preferably, this portion is heated to a temperature slightly above 114° C., and maintained at such temperature throughout the entire reaction. Para-nitrophenyl acetate is produced in quantitative amounts which is withdrawn from the bottom of the column through the outlet 24.

By the process according to the present invention it is also possible to acetylate an alcohol, an amine, a phenol, or an acid with a gas containing a substituted ketene. This may be done in the same apparatus for acetylating acetic acid with a gas containing ketene above described but in place of a gas containing ketene, a gas containing a substituted ketene like methyl ketene is used.

As an example of the process for acetylating an alcohol with a gas containing methyl ketene the following may be given. Ethyl alcohol is introduced into the column through the inlet 21 and is then subjected to the same cycle as above described for the acetylation of acetic acid with a gas containing ketene. The intermediate portion of the column 17 surrounded by the jacket 19 is heated to a temperature above the boiling point of the alcohol, namely about 78° C., and maintained at such temperature throughout the entire reaction. Ethyl propionate is formed in quantitative amounts which is withdrawn from the bottom of the column through the outlet 24.

To acetylate an amine with a gas containing methyl ketene, ortho-nitro-aniline is introduced in the column through the inlet 21, and is then subjected to the same cycle as above described for the acetylation of acetic acid with a gas containing ketene. In this case, the intermediate portion of the column surrounded by the jacket 19 is heated, preferably to a temperature above the melting point of the nitro-aniline, namely about 114° C., and maintained at such temperature throughout the entire reaction. Ortho-nitropropanilide is produced in quantitative amounts, which is withdrawn from the bottom of the column through the outlet 24.

For the acetylation of a phenol with a gas containing methyl ketene, para-cresol is introduced in the column through the inlet 21, and is then subjected to the same cycle as above described for the acetylation of acetic acid with a gas containing ketene. The intermediate portion of the column surrounded by the jacket 19 is heated to a temperature above the melting point of the cresol, namely about 36° C. but below the boiling point thereof, namely 202° C. Preferably, this portion of the column is heated to a temperature slightly above 100° C. and maintained at such temperature throughout the entire reaction. Para-tolyl propionate is formed in quantitative amounts which is withdrawn from the bottom of the column through the outlet 24.

For the acetylation of an acid with a gas containing methyl ketene, the ethyl ester of ortho-hydroxy benzoic acid is introduced in the column through the inlet 21, and is then subjected to the same cycle as above described for the acetylation of an acid with a gas containing ketene. In this case, the intermediate portion of the column surrounded by the jacket 19 is heated preferably, to a temperature above the boiling point of said acid, namely about 231° C. and maintained at such temperature throughout the entire reaction. Acetyl - ortho - hydroxy - ethyl - benzoate is formed in quantitative amounts which is withdrawn from the bottom of the column through the outlet 24.

Various specified details of procedure and conditions of operation have been set forth above for the purpose of giving a clear understanding of the process, but the invention is not limited to the exact details given, as it includes modifications and changes coming within the scope of the appended claims.

Having thus described the invention, what is claimed as new and desired to be secured by Letters Patent is:

1. The process for preparing acetylated products which comprises causing a substance known to be capable of forming acetylated products upon reaction with a ketene, in a dispersed state to intimately commingle with a gas containing a ketene at a temperature above the boiling point of said substance but below that of the acetylated product to be formed to thereby form an acetylated product in substantially quantitative amounts.

2. The process for preparing acetylated products which comprises causing a substance known to be capable of forming acetylated products upon reaction with a ketene, in a dispersed state to intimately commingle with a gas containing a ketene at a temperature ranging from 100° to 300° C. to thereby form an acetylated product in substantially quantitative amounts.

3. The process for preparing acetylated products which comprises flowing a substance known to be capable of forming acetylated products upon reaction with a ketene, in a dispersed state countercurrent to a gas containing a ketene at a temperature above the boiling point of said substance but below that of the acetylated product to be formed to thereby form an acetylated product in substantially quantitative amounts.

4. The process for preparing acetylated products which comprises flowing a substance known to be capable of forming acetylated products upon reaction with a ketene, in a dispersed state countercurrent to a gas containing a ketene at a temperature ranging from 100° to 300° C. to thereby form an acetylated product in substantially quantitative amounts.

5. The process for preparing acetylated products which comprises flowing a substance known to be capable of forming acetylated products upon reaction with a ketene, in a dispersed state through a reaction zone countercurrent to a gas containing ketene admixed with acetone vapors at a temperature above the boiling point of said substance but below that of the acetylated product to be formed, withdrawing the thus formed acetylated product, removing the acetone, unreacted substance capable of being acetylated, and acetylated product from the gas which has passed through the reaction zone, separating the acetone from said unreacted substance and acetylated product, and returning said unreacted substance and acetylated product to the reaction zone.

6. The process for preparing acetylated products which comprises flowing a substance known to be capable of forming acetylated products upon a reaction with a ketene, in a dispersed state through a reaction zone countercurrent to a gas containing ketene admixed with acetone vapors at a temperature above the boiling point of said substance but below that of the acetylated product to be formed, withdrawing the thus formed acetylated product, removing the acetone, unreacted substance capable of being acetylated, and acetylated product from the gas which has passed through the reaction zone, separating the acetone from said unreacted substance and acetylated product, and returning said unreacted substance and acetylated product to the reaction zone.

7. The process for preparing acetylated products which comprises flowing a substance known to be capable of forming acetylated products upon reaction with a ketene, in a dispersed state through a reaction zone countercurrent to a gas containing ketene admixed with acetone vapors at a temperature ranging from 100° to 300° C., withdrawing the thus formed acetylated product, removing the acetone, unreacted substance capable of being acetylated, and acetylated product from the gas which has passed through the reaction zone, separating the acetone from said unreacted substance and acetylated product, and returning said unreacted substance and acetylated product to the reaction zone.

8. The process for preparing acetic anhydride which comprises causing glacial acetic acid in a dispersed state to intimately commingle with a gas containing ketene at a temperature above the boiling point of said acetic acid but below that of the acetic anhydride to be formed to thereby form acetic anhydride in substantially quantitative amounts.

9. The process for preparing acetic anhydride which comprises causing glacial acetic acid in a dispersed state to intimately commingle with a gas containing ketene at a temperature ranging from 100° to 300° C. to thereby form acetic anhydride in substantially quantitative amounts.

10. The process for preparing acetic anhydride which comprises flowing glacial acetic acid in a dispersed state through a reaction zone countercurrent with a gas containing ketene at a temperature above the boiling point of said acetic acid but below that of the acetic anhydride to be formed to thereby form acetic anhydride in substantially quantitative amounts.

11. The process for preparing acetic anhydride which comprises flowing glacial acetic acid in a dispersed state through a reaction zone countercurrent with a gas containing ketene at a temperature ranging from 100° to 300° C. to thereby form acetic anhydride in substantially quantitative amounts.

12. The process for preparing acetic anhydride which comprises flowing liquid glacial acetic acid in a dispersed state through a reaction zone countercurrent to a gas containing ketene admixed with acetone vapors at a temperature above the boiling point of said acetic acid but below that of the acetic anhydride to be formed, withdrawing the acetic anhydride thus formed, removing the acetone, unreacted glacial acetic acid, and acetic anhydride from the gas which has passed through the reaction zone, separating the acetone from the unreacted glacial acetic acid and acetic anhydride, and returning said acetic acid and acetic anhydride to the reaction zone.

13. The process for preparing acetic anhydride which comprises flowing liquid glacial acetic acid in a dispersed state through a reaction zone countercurrent to a gas containing ketene admixed with acetone vapors at a temperature ranging from 100 to 300° C., withdrawing the acetic anhydride thus formed, removing the acetone, unreacted glacial acetic acid, and acetic anhydride from the gas which has passed through the reaction zone, separating the acetone from the unreacted glacial acetic acid and acetic anhydride, and returning said acetic acid and acetic anhydride to the reaction zone.

In testimony whereof I hereunto affix my signature.

FRANCIS O. RICE.